(12) United States Patent
Suh et al.

(10) Patent No.: US 9,882,184 B2
(45) Date of Patent: Jan. 30, 2018

(54) RECHARGEABLE BATTERY HAVING STACKED ELECTRODE ASSEMBLY

(71) Applicant: SAMSUNG SDI CO., LTD., Yongin-si, Gyeonggi-do (KR)

(72) Inventors: Jun-Won Suh, Yongin-si (KR); Jeong-Doo Yi, Yongin-si (KR); Ju-Hyeong Han, Yongin-si (KR); Ju-Hee Sohn, Yongin-si (KR); Hyun-Hwa Song, Yongin-si (KR); Seok-Hun Hong, Yongin-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 242 days.

(21) Appl. No.: 14/794,675

(22) Filed: Jul. 8, 2015

(65) Prior Publication Data
US 2016/0141587 A1    May 19, 2016

(30) Foreign Application Priority Data
Nov. 19, 2014    (KR) .................. 10-2014-0161731

(51) Int. Cl.
*H01M 2/02* (2006.01)
*H01M 2/08* (2006.01)
*H01M 10/04* (2006.01)

(52) U.S. Cl.
CPC ............. *H01M 2/08* (2013.01); *H01M 2/024* (2013.01); *H01M 2/0207* (2013.01); *H01M 2/0275* (2013.01); *H01M 10/0413* (2013.01); *H01M 10/0436* (2013.01); *H01M 2220/20* (2013.01); *H01M 2220/30* (2013.01)

(58) Field of Classification Search
CPC ............ H01M 2/24; H01M 2/02; H01M 2/08; H01M 10/0525; H01M 2/0202; H01M 2/0237; H01M 2220/20; H01M 2220/30
USPC .................................. 429/179, 186
See application file for complete search history.

(56) References Cited

U.S. PATENT DOCUMENTS

| 2001/0041289 | A1 | 11/2001 | Hikmet et al. | |
| 2008/0057384 | A1* | 3/2008 | Jang | H01M 2/021 |
| | | | | 429/129 |
| 2012/0115020 | A1 | 5/2012 | Hwang | |
| 2012/0276436 | A1 | 11/2012 | Kaneko et al. | |

FOREIGN PATENT DOCUMENTS

| JP | 2003-526185 A | 9/2003 |
| KR | 10-2007-0053614 A | 5/2007 |
| KR | 10-2012-0047824 A | 5/2012 |

* cited by examiner

*Primary Examiner* — Gary Harris
(74) *Attorney, Agent, or Firm* — Knobbe Martens Olson & Bear LLP (57) ABSTRACT

Disclosed herein is a rechargeable battery capable of maintaining alignment among a positive electrode, a negative electrode, and a separator of an electrode assembly even in the case in which a form thereof is changed or bent. The rechargeable battery includes: an electrode assembly formed by stacking a first electrode, a separator, and a second electrode, and having an alignment groove formed therein; a case having flexibility and accommodating the electrode assembly therein; and an alignment guide protruding from the case and partially coupled to the alignment groove so as to accommodate and guide a change in a length of the electrode assembly depending on bending.

15 Claims, 12 Drawing Sheets

RECHARGEABLE BATTERY HAVING STACKED ELECTRODE ASSEMBLY

INCORPORATION BY REFERENCE TO ANY PRIORITY APPLICATIONS

Any and all priority claims identified in the Application Data Sheet, or any correction thereto, are hereby incorporated by reference under 37 CFR 1.57.

For example, this application claims priority to and the benefit of Korean Patent Application No. 10-2014-0161731 filed in the Korean Intellectual Property Office on Nov. 19, 2014, disclosures of which are incorporated herein in their entirety.

BACKGROUND

Field

This disclosure relates to a rechargeable battery having flexibility.

Description of the Related Technology

In accordance with the development of a technology for mobile devices, a demand for a rechargeable battery as an energy source has increased. The rechargeable battery is a battery repeatedly charged and discharged unlike a primary battery.

A small capacity rechargeable battery may be used in a small portable electronic device such as a mobile phone, a laptop computer, and a camcorder, and a large capacity rechargeable battery may be used as a power supply for driving a motor of a hybrid vehicle and an electric vehicle.

For example, a pouch type rechargeable battery includes a stacked type electrode assembly performing a charging and discharging operation, a pouch accommodating the electrode assembly and an electrolyte therein, and electrode tabs leading the electrode assembly to the outside of the pouch.

The stacked type electrode assembly is formed by repeatedly stacking units, wherein each stack each includes a negative electrode, a separator, a positive electrode, and a separator and is led to the outside of the pouch by the electrode tabs welded to uncoated parts of the negative and positive electrodes.

As for the sizes of the positive electrode, the negative electrode, the separator, and the pouch in the rechargeable battery to which the stacked type electrode assembly is applied, size of the negative electrode is larger than that of the positive electrode and size of the separator is equal to or larger than that of the negative electrode, and size of the pouch is larger than that of the separator.

The size of the negative electrode should be larger than that of the positive electrode in order for lithium ions moving at the outermost portion of the positive electrode not to be precipitated on the outer side of the negative electrode at the time of charging the rechargeable battery. The size of the separator should be larger than that of the positive electrode and be at least equal to that of the outermost portion of the negative electrode or larger than that of the negative electrode in order to physically separate the positive electrode and the negative electrode from each other.

In order to satisfy the above-mentioned relationships and secure energy density of the rechargeable battery, size differences between the positive electrode and the negative electrode, between the negative electrode and the separator, and the positive electrode and the separator, need to be minimized.

As an example, in the pouch type rechargeable battery, size differences among the negative electrode, the separator, and the positive electrode are appropriately set so that an internal short-circuit due to a direct contact between the positive electrode and the negative electrode is not generated even though external impact is applied to the electrode assembly due to vibrations, and the like.

Typically a problem does not occur when the form of a pouch type rechargeable battery is maintained. But when the positive electrode and the negative electrode disposed in the pouch type rechargeable battery move as the form of the rechargeable battery is bent, it can result in an internal short-circuit. In addition, in cases where the internal short-circuit is severe, explosion and a fire may occur in the pouch type rechargeable battery.

SUMMARY

The present disclosure has been made in an effort to provide a rechargeable battery having advantages of maintaining alignment among a positive electrode, a negative electrode, and a separator of an electrode assembly even in the case in which a form thereof is changed or bent.

An exemplary embodiment provides a rechargeable battery including: an electrode assembly formed by stacking a first electrode, a separator, and a second electrode, and having an alignment groove formed therein; a case having flexibility and accommodating the electrode assembly therein; and an alignment guide protruding from the case and partially coupled to the alignment groove so as to accommodate and guide a change in a length of the electrode assembly depending on the extent of bending.

The rechargeable battery may further include first and second electrode tabs connected to the first and second electrodes, respectively and led from one end portion of the case to the outside to form a tab distance there between, wherein the alignment groove and the alignment guide have predetermined lengths in a direction in which the length of the electrode assembly is changed at opposite sides to sides adjacent to the first and second electrode tabs.

The case may include: first and second exterior materials disposed on both surfaces of the electrode assembly, respectively; and a gasket leading the first and second electrode tabs to the outside while sealing a space between the first and second exterior materials and including the alignment guide.

The alignment groove may include first to third grooves each formed in the first and second electrodes and the separator that are stacked and corresponding to the alignment guide.

The alignment guide may include: a first guide protruding from a gasket in a direction in which the length of the electrode assembly is changed; and a second guide spaced apart from the first guide to be in parallel with the first guide and formed at a sidewall of the gasket.

The first groove of the first electrode may be formed in parallel with the first guide so as to correspond to the first guide, and a part of the first groove adjacent to the second guide may be formed of a protruding uncoated part of the first electrode and be coupled between the first and second guides.

The second groove of the second electrode may be formed so as to correspond to the first groove and the protruding uncoated part of the first electrode.

The third groove of the separator may be formed so as to correspond to the first groove of the first electrode, and a part of the third groove adjacent to the second guide may include a protruding support part supporting the protruding uncoated part of the first electrode.

The protruding uncoated part of the first electrode may have a protecting tape further attached to one side thereof.

The first groove of the first electrode may be formed in parallel with the first guide so as to correspond to the first guide, and, and a part of the first groove adjacent to the second guide may be formed of a protruding coated part of the first electrode and is coupled between the first and second guides.

The second groove of the second electrode may be formed so as to correspond to the first groove and the protruding coated part of the first electrode.

The third groove of the separator may be formed so as to correspond to the first groove of the first electrode, and a part of the third groove adjacent to the second guide may include a protruding support part supporting the protruding coated part of the first electrode.

The protruding coated part of the first electrode may have a protecting tape further attached to one side thereof.

The third groove of the separator may be formed so as to correspond to the first groove and the protruding uncoated part of the first electrode The first groove of the first electrode may be formed in parallel with the first guide so as to correspond to the first guide, and a part of the first groove adjacent to the second guide may be formed of the protruding uncoated part of the first electrode and is coupled between the first and second guides.

The protruding coated part of the first electrode may have a protecting tape further attached to one side thereof.

As set forth above, in an exemplary embodiment, since the alignment groove is provided in the electrode assembly, the alignment guide is provided in the case (pouch), and the alignment groove and the alignment guide are coupled to each other, even in the case in which the rechargeable battery is deformed or bent, the alignment among the positive electrode, the negative electrode, and the separator of the electrode assembly may be maintained.

Therefore, when the rechargeable battery is bent due to the bending stress, the fracture of the rechargeable battery may be prevented, and the internal short-circuit of the rechargeable battery may be prevented.

DETAILED DESCRIPTION

Reference will now be made in detail to the certain embodiments of the present disclosure examples of which are illustrated in the accompanying drawings. Various aspects of the present disclosure may be embodied in many different forms and should not be construed as being limited to the example embodiments set forth herein. Rather, these example embodiments of the disclosure are provided so that this disclosure will be thorough and complete and will convey various aspects of the disclosure to those skilled in the art In the drawings, the thickness of layers and regions are exaggerated for clarity. Here, like reference numerals refer to like elements throughout. As used herein, the term "and/or" includes any and all combinations of one or more of the associated listed items In addition, the terminology used herein is for the purpose of describing particular embodiments only and is not intended to be limiting of the disclosure. As used herein, the singular forms are intended to include the plural forms as well, unless the context clearly indicates otherwise. It will be further understood that the terms "comprises," and/or "comprising," when used in this specification, specify the presence of stated features, numbers, steps, operations, elements, and/or components, but do not preclude the presence or addition of one or more other features, numbers, steps, operations, elements, components, and/or groups thereof.

Figure 1:
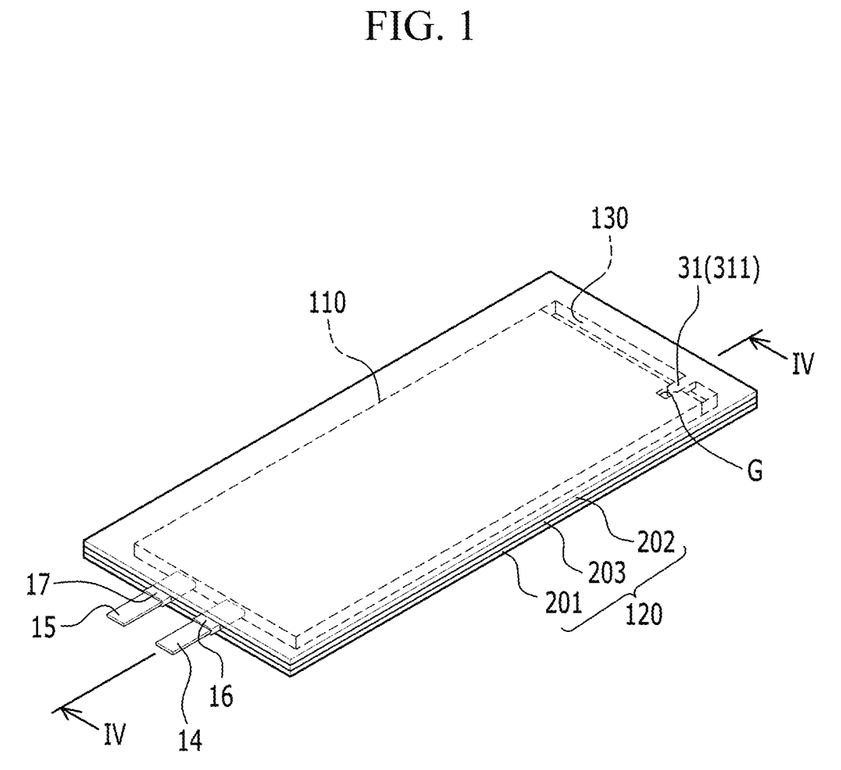
FIG. 1 is a perspective view of a rechargeable battery according to a first exemplary embodiment.
Figure 2:
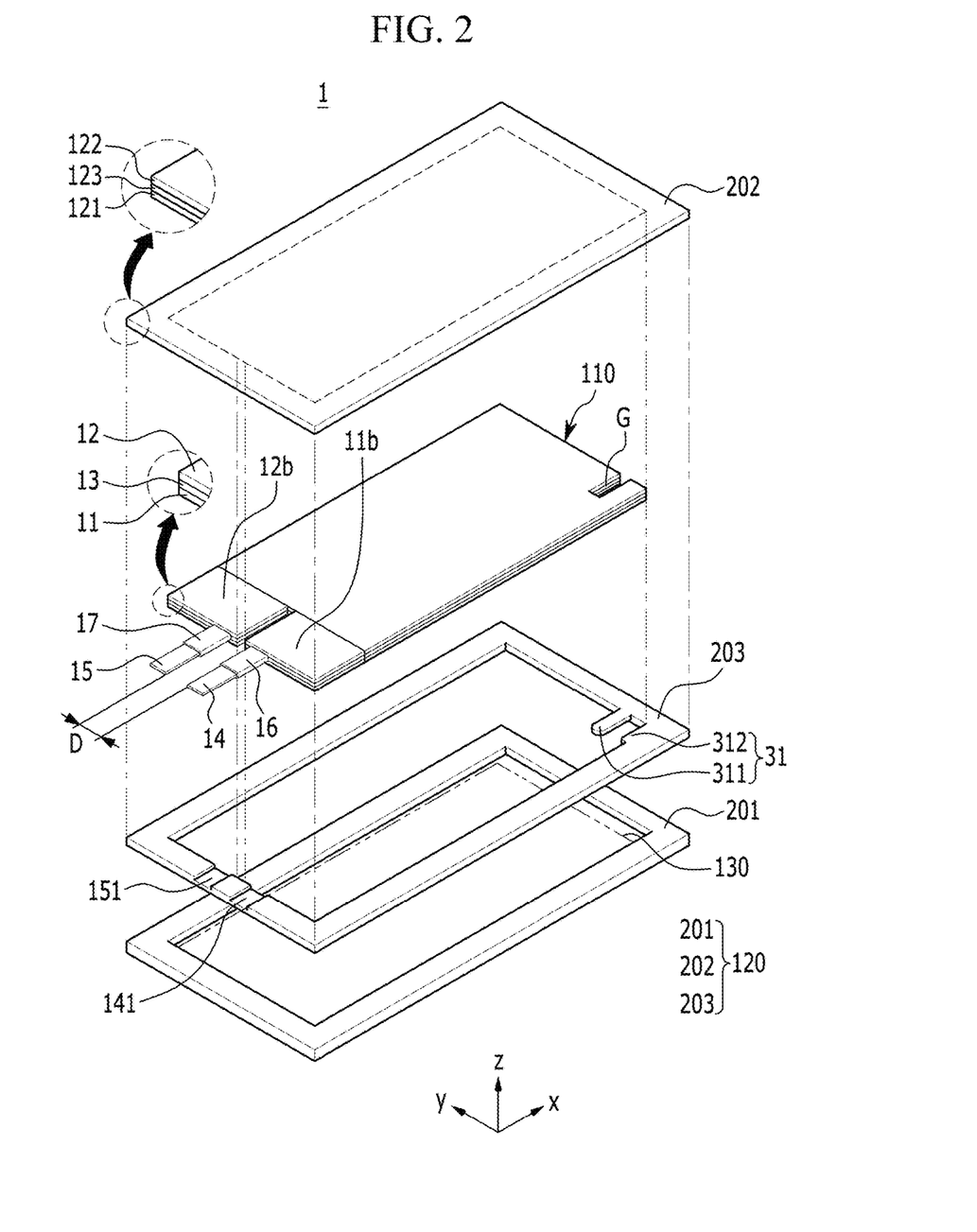
FIG. 2 is an exploded perspective view of the rechargeable battery of FIG. 1.

FIG. 1 is a perspective view of a rechargeable battery according to a first exemplary embodiment; and FIG. 2 is an exploded perspective view of the rechargeable battery of FIG. 1. Referring to FIGS. 1 and 2, a rechargeable battery 1 according to a first exemplary embodiment includes an electrode assembly 110 charging and discharging a current therein and therefrom and a case (hereinafter, referred to as a "pouch 120" by way of example) embedding the electrode assembly 110 therein and having flexibility.

The electrode assembly 110 includes an alignment groove G formed at one side thereof, and the pouch 120 includes an alignment guide 31 protruding toward the alignment groove G so as to be partially coupled to the alignment groove G.

When the rechargeable battery 1 is bent by bending stress, a length of the electrode assembly 110 is changed. Here, since the alignment groove G and the alignment guide 31 are coupled to each other and move, alignment of the electrode assembly 110 may be maintained within the pouch 120.

A margin part 130 is provided between the pouch 120 including the alignment guide 31 and an inner surface of the electrode assembly 110 so as to accommodate the change in the length of the electrode assembly 110 when the electrode assembly 110 is bent.

That is, the margin part 130 may allow the alignment groove G to move along the alignment guide 31 while accommodating the change in the length of the electrode assembly 110, thereby allowing the electrode assembly 110 to be more smoothly aligned.

Figure 3:
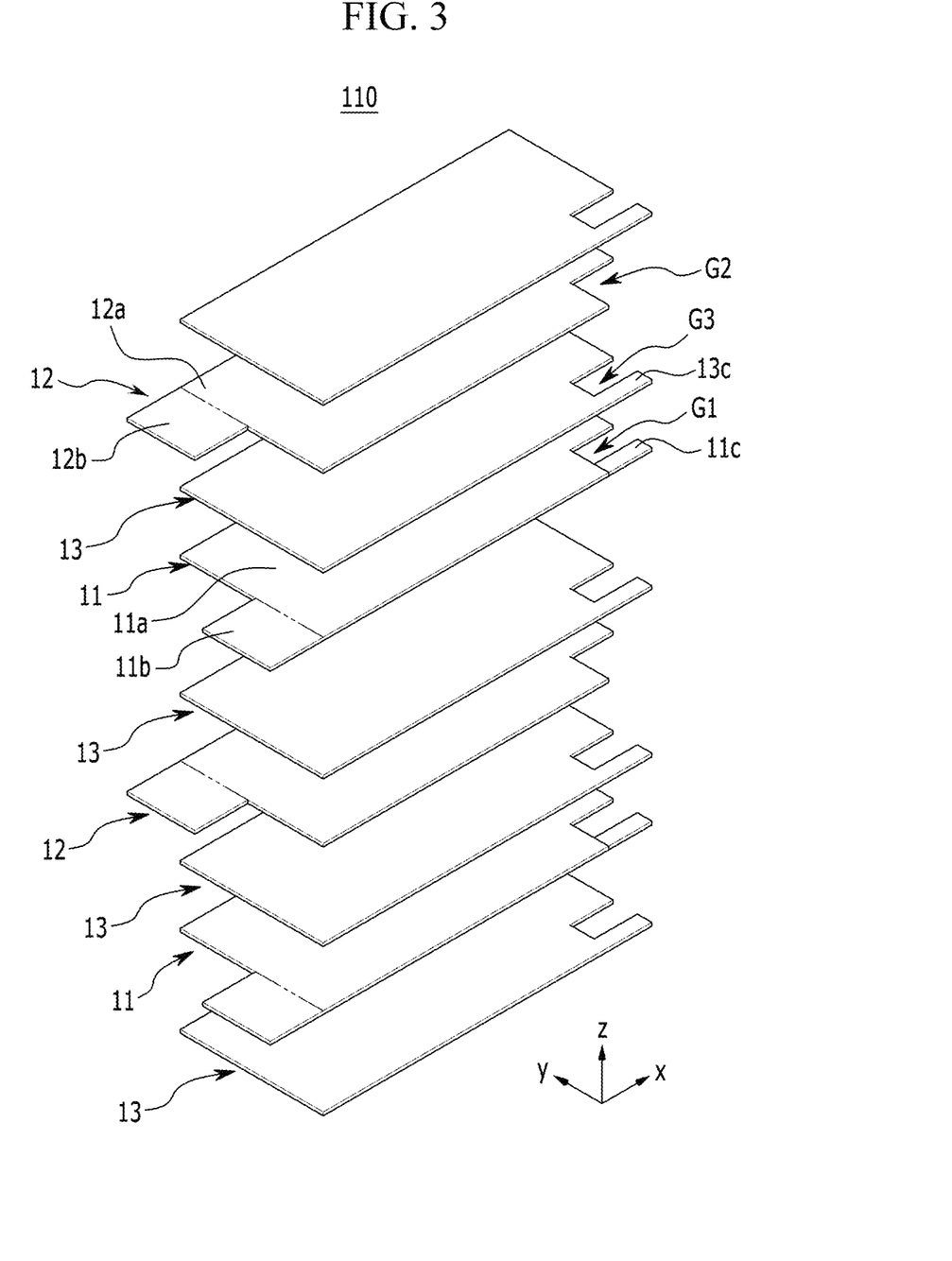
FIG. 3 is an exploded perspective view of an electrode assembly applied to FIG. 2.
Figure 4:
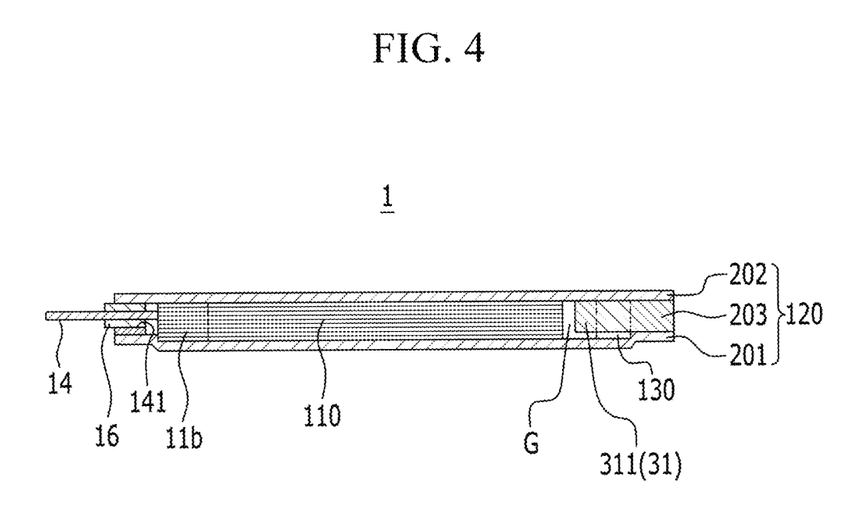
FIG. 4 is a cross-sectional view taken along line IV-IV of FIG. 1.

FIG. 3 is an exploded perspective view of an electrode assembly applied to FIG. 2; and FIG. 4 is a cross-sectional view taken along line IV-IV of FIG. 1. Referring to FIGS. 2 to 4, the electrode assembly 110 is formed in a stacked shape by stacking and disposing first electrodes 11 (for example, positive electrodes) and second electrodes 12 (for example, negative electrodes) with each of separators 13 interposed there between. The separator 13 may be formed of a polymer film passing lithium ions there through.

The electrode assembly 110 further includes a first electrode tab 14 and a second electrode tab 15 each connected to the first and second electrodes 11 and 12 (FIG. 2). The first and second electrode tabs 14 and 15 are led outwardly from one end portion of the pouch 120 to form a tab distance (D) there between (FIG. 2).

The first and second electrodes 11 and 12 having the separator 13 interposed there between are connected to the first and second electrode tabs 14 and 15, respectively, to be fixed to the pouch 120, and have free ends formed at the other sides thereof. That is, when the electrode assembly 110 is bent, the first and second electrodes 11 and 12 and the separator 13 are maintained in a state in which they may be slipped from sides adjacent to the first and second electrode tabs 14 and 15 to the free ends.

The margin part 130 is set between the electrode assembly 110 and an inner surface of the pouch 120 at opposite sides to the sides adjacent to the first and second electrode tabs 14 and 15. That is, the margin part 130 accommodates the change in the length of the electrode assembly 110 bent in a length direction (an x axis direction) of the rechargeable battery 1 and the electrode assembly 110 therein.

Here, the alignment groove G of the electrode assembly 110 and the alignment guide 31 of the pouch 120 have predetermined lengths in the direction (the x axis direction) in which the length of the electrode assembly 110 is changed at the opposite sides to the sides adjacent to the first and second electrode tabs 14 and 15 so as to maintain the alignment of the electrode assembly 110.

That is, the alignment groove G and the alignment guide 31 are maintained in a straight line state in the x axis direction in a state in which the rechargeable battery 1 is flat. When the bending stress acts on the rechargeable battery 1, the electrode assembly 110 is bent. In this case, the first and second electrodes 11 and 12 having the separator 13 interposed there between are slipped while being maintained in a state in which they are fixed to the first and second electrode tabs 14 and 15, respectively.

Therefore, an increase or a decrease of the length is generated in the free ends of the first and second electrodes 11 and 12. In this case, the alignment groove G moves along the alignment guide 31 to maintain the alignment among the first and second electrodes 11 and 12 and the separator 13. Therefore, the electrode assembly and the rechargeable battery 1 may be smoothly bent.

The first electrode 11 includes a coated part 11a that is formed by applying an active material to a current collector formed of a metal thin plate and an uncoated part 11b that does not have the active material applied thereto to be set to an exposed current collector. For example, the current collector of the first electrode 11 and the first electrode tab 14 may be formed of aluminum (Al).

The second electrode 12 includes a coated part 12a that is formed by applying an active material different from the active material of the first electrode 11 to a current collector formed of a metal thin plate and an uncoated part 12b that does not have the active material applied thereto to be set to an exposed current collector. For example, the current collector of the second electrode 12 and the second electrode tab 15 may be formed of copper (Cu).

In a stacked state, the uncoated parts 11b and 12b of the first and second electrodes 11 and 12 are alternately disposed at both sides in a width direction (a y axis direction). That is, in FIG. 3, the uncoated parts 11b of the first electrodes 11 are disposed at the right, and the uncoated parts 12b of the second electrodes 12 are disposed at the left.

Again referring to FIGS. 1 and 2, the first electrode tab 14 is connected to the uncoated parts 11b of the first electrodes 11, and the second electrode tab 15 is connected to the uncoated parts 12b of the second electrodes 12. Therefore, the first and second electrode tabs 14 and 15 form the tab distance D there between at an outer portion of one side of the pouch 120. The first and second electrode tabs 14 and 15 may be connected to the uncoated parts 11b and 12b, respectively, by welding.

The pouch 120 has the flexibility and accommodates the electrode assembly 110 therein, and an outer side portion of the pouch 120 is heat-fused to form the rechargeable battery 1. For example, the pouch 120 includes first and second exterior materials 201 and 202 disposed on both surfaces of the electrode assembly 110, respectively (FIG. 4), and a gasket 203.

The gasket 203 leads the first and second electrode tabs 14 and 15 to the outside of the pouch 120 while sealing outer sides of the first and second exterior materials 201 and 202. The gasket 203 may include fixing grooves 141 and 151 each fixing the first and second electrode tabs 14 and 15. Here, the first and second electrode tabs 14 and 15 are coated with insulating members 16 and 17, respectively, to be fixed to the fixing grooves 141 and 151, respectively, and are led to the outside of the pouch 120 through the fused parts.

That is, the gasket 203 fixes the first and second electrode tabs 14 and 15 and improves sealing performance of the first and second exterior materials 201 and 202 (FIG. 2). The insulating members 16 and 17 electrically insulate the first and second electrode tabs 14 and 15 from each other, and electrically insulate the first and second electrode tabs 14 and 15 from the pouch 120.

The pouch 120 may have the margin part 130 set at a free end of the electrode assembly 110 and may be formed in a multilayer sheet structure in which it encloses an outer portion of the electrode assembly 110. For example, the pouch 120 includes an inner surface sheet 121, an outer surface sheet 122, and a metal sheet 123 (FIG. 2).

The inner surface sheet 121 may form an inner surface of the pouch 120, perform insulation and heat-fusion operations, and be formed of a polymer sheet. The outer surface sheet 122 may form an outer surface of the pouch 120, perform a protection operation, and be formed of a polyethylene terephthalate (PET) sheet, a nylon sheet, or a PET-nylon composite sheet.

The metal sheet 123 is provided between the inner surface sheet 121 and the outer surface sheet 122 and provides mechanical strength of the pouch 120. For example, the metal sheet 123 may be formed of an aluminum sheet.

The first and second exterior materials 201 and 202 may include the inner surface sheets 121, the outer surfaces sheets 122, and the metal sheets 123 having the same layer structure, respectively. Although not shown, the pouch may include the first and second exterior materials fused to each other without including the gasket, thereby embedding the electrode assembly therein.

For example, the first exterior material 201 is formed in a concave structure so as to accommodate the electrode assembly 110 therein, and the second exterior material 202 is formed in a flat structure so as to cover the electrode assembly 110 accommodated in the first exterior material 201. Although not shown, the second exterior material may also be connected to the first exterior material.

Figure 5:
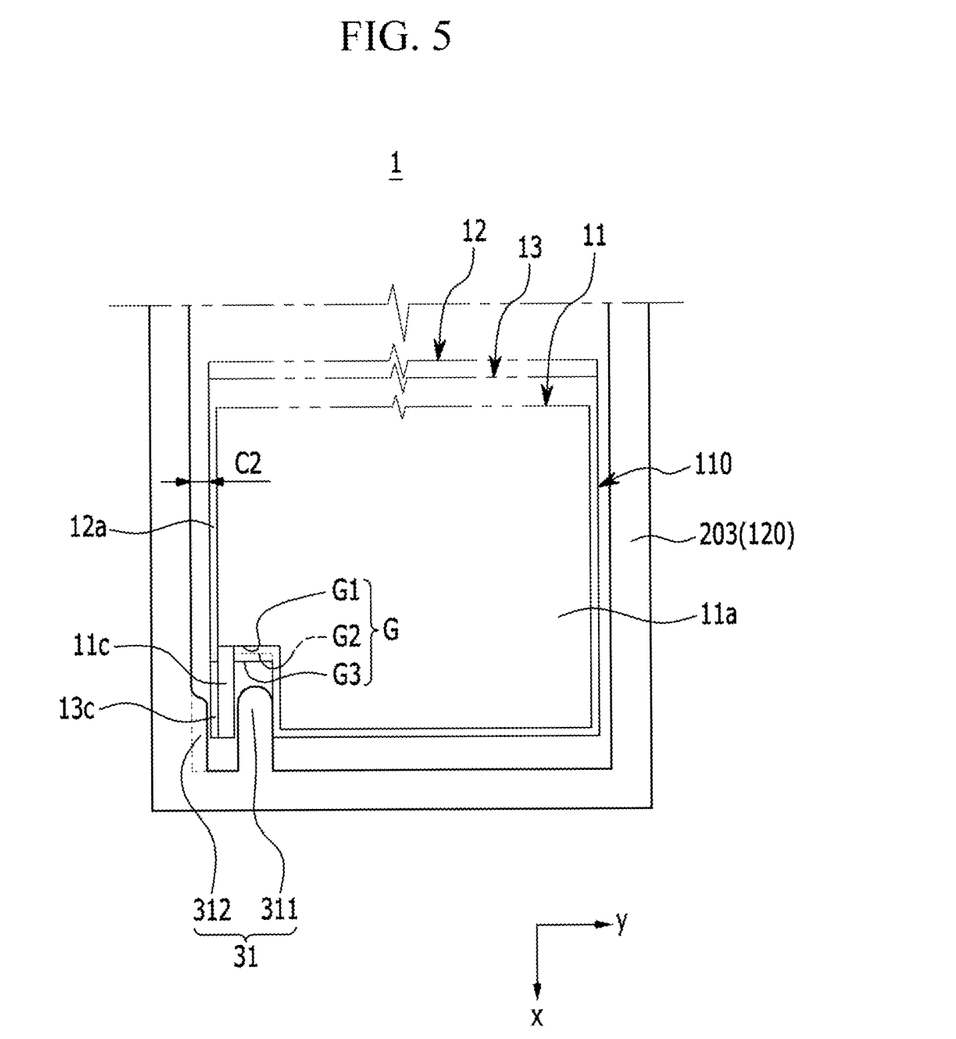
FIG. 5 is a partial plan view showing an alignment state between a gasket and an electrode assembly of FIG. 2.

FIG. 5 is a partial plan view showing an alignment state between a gasket and an electrode assembly of FIG. 2. Referring to FIGS. 2 to 5, the alignment groove G formed in the electrode assembly 110 includes a first groove G1, a second groove G2, and a third groove G3 each formed in the first and second electrodes 11 and 12 and the separator 13 that are stacked. The first to third grooves G1 to G3 are partially coupled so as to correspond to the alignment guide 31.

The alignment guide 31 includes a first guide 311 and a second guide 312 formed at one side of the gasket 203. In a first exemplary embodiment, the alignment guide 31 is provided in the gasket 203.

Although not shown, in the case in which the gasket is not used, the alignment guide may also be formed in the first and second exterior materials so as to correspond to the alignment groove.

The first guide 311 linearly protrudes from the gasket 203 in the direction (the x axis direction) in which the length of the electrode assembly 110 is changed and is inserted into the alignment groove G that is linearly formed, thereby setting a primary position of the electrode assembly 110 within the pouch 120.

The second guide 312 is formed at a sidewall of the gasket 203 so as to be spaced apart from the first guide 311 in parallel with the first guide 311. When the first guide 311 is inserted into the alignment groove G, the second guide 312 supports one side forming the alignment groove G to set the outermost position of the electrode assembly 110 within the pouch 120.

The electrode assembly 110 maintains a gap C2 (in the y axis direction) from an inner sidewall of the pouch 120 within the pouch 120 by the second guide 312, such that the electrode assembly 110 is smoothly slipped within the pouch 120 when the rechargeable battery 1 is bent.

The first groove G1 of the first electrode 11 is formed in parallel with the first guide 311 so as to correspond to the first guide 311. A part of the first groove G1 adjacent to the second guide 312 is formed of a protruding uncoated part 11c of the first electrode 11, wherein the protruding uncoated part 11c is coupled between the first guide 311 and the second guide 312. That is, when the length of the electrode assembly 110 is changed, the first groove G1 is guided by the first guide 311 and the protruding uncoated part 11c is guided between the first and second guides 311 and 312.

The second groove G2 of the second electrode 12 is formed so as to correspond to the first groove G1 and the protruding uncoated part 11c of the first electrode 11. Since the second electrode 12 is formed at a size larger than that of the first electrode 11 and the first groove G1 of the first electrode 11 is formed at a size larger than that of the second groove G2 of the second electrode 12, an entire region of the coated part 11a of the first electrode 11 may correspond to the coated part 12a of the second electrode 12. Therefore, capacity performance of the rechargeable battery 1 may be determined by the size of the first electrode 11.

The third groove G3 of the separator 13 is formed so as to correspond to the first groove G1 of the first electrode 11. A part of the third groove G3 adjacent to the second guide 312 is formed of a protruding support part 13c, wherein the protruding support part 13c is coupled between the first guide 311 and the second guide 312 while supporting the protruding uncoated part 11c of the first electrode 11. That is, when the length of the electrode assembly 110 is changed, the third groove G3 is guided by the first guide 311 and the protruding support part 13c is guided between the first and second guides 311 and 312.

In a portion in which the first and second grooves G1 and G2 face each other, the third groove G3 is formed at a size smaller than those of the first and second grooves G1 and G2. That is, since the separator 13 is formed at a size larger than those of the first and second electrodes 11 and 12, it may electrically insulate the first and second electrodes 11 and 12 from each other. In FIG. 5, a width (in the y axis direction) of the separator 13 is the same as that of the second electrode 12, and a length (in the x axis direction) of the third groove G3 is longer than that of the second groove G2.

When the bending stress acts on the rechargeable battery 1, the pouch 120 and the electrode assembly 110 are bent, such that the length of the electrode assembly 110 is increased within the pouch 120 and an increment of the length is accommodated in the margin part 130.

In this case, the first and second electrodes 11 and 12 and the separator 13 are guided into the first to third grooves G1 to G3 by the first guide 311 while being slipped due to the increase in the length. Therefore, even in the case in which the electrode assembly 110 is bent, the first and second electrode 11 and 12 and the separator 13 may be maintained in a state in which they are aligned with one another.

The protruding uncoated part 11c and the protruding support part 13c are guided by the second guide 312. Therefore, the first and second electrodes 11 and 12 and the separator 13 may be guided while being maintained in a state in which the alignment there between is more stable.

The length of the electrode assembly is increased due to the action of the bending stress, the increased length is accommodated in the margin part 130, and the first and second electrodes and the separator are aligned with one another, such that the electrode assembly 110 and the rechargeable battery 1 may be bent enough to correspond to the bending stress. Therefore, when the rechargeable battery 1 is bent, a fracture and an internal short-circuit do not occur in the rechargeable battery 1.

The rechargeable battery 1 according to an embodiment and a pouch type rechargeable battery (Comparative Example) in which the margin part, the alignment groove, and the alignment guide are not formed were manufactured, bending stress was applied to the rechargeable battery 1 to bend the rechargeable battery 1, and capacities of the rechargeable battery 1 were compared with each other before and after the rechargeable battery 1 is bent to measure performance deterioration.

For example, in the rechargeable battery 1 in which a characteristic length (a length at which slip is generated in the electrode assembly 110 when the rechargeable battery is bent) is 110 mm, a thickness (a thickness of the electrode assembly 110 at a portion at which the slip is generated) is 1.3 mm, a bending durability test of the rechargeable battery 1 has been performed under a radius of curvature of 25 mm.

At the time of performing a 1000 cycle bending test on the rechargeable battery according to Comparative Example, a short-circuit was generated in the rechargeable battery. Thus it was impossible to measure performance of the rechargeable battery.

On the other hand, the rechargeable battery 1 according to an embodiment has maintained a capacity of 98% as compared with an initial capacity even after it is subjected to a 10,000 cycle bending test. Thus it was confirmed that the rechargeable battery 1 according to an embodiment maintains a capacity comparable to the initial capacity even after it is subjected to the 10,000 cycle bending test.

Hereinafter, various exemplary embodiments will be described. For convenience, a description for components that are the same as those of a first exemplary embodiment and the above-mentioned exemplary embodiment will be omitted, and components different from those of a first exemplary embodiment and the above-mentioned exemplary embodiment will be described.

Figure 6:
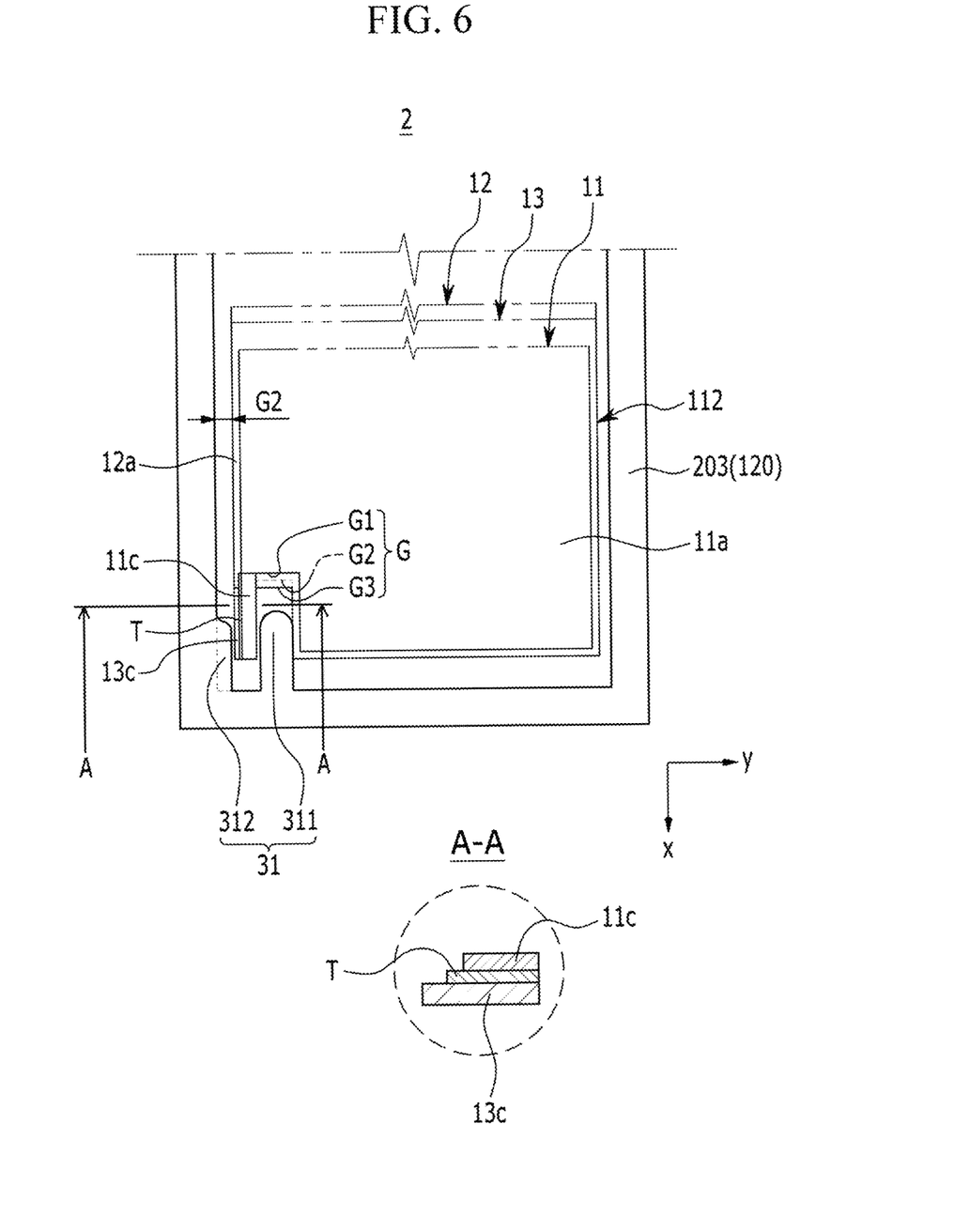
FIG. 6 is a partial plan view showing an alignment state between a gasket and an electrode assembly in a rechargeable battery according to a second exemplary embodiment.

FIG. 6 is a partial plan view showing an alignment state between a gasket and an electrode assembly in a rechargeable battery according to a second exemplary embodiment. Referring to FIG. 6, in a rechargeable battery 2 according to a second exemplary embodiment, the protruding uncoated part 11c of the first electrode 11 has a protecting tape T further attached to one side thereof.

The protecting tape T is attached onto one surface of the protruding uncoated part 11c to enhance strength. For convenience, in FIG. 6, the protecting tape T was shown and visualized so as to be larger than the protruding uncoated part 11c.

Therefore, when the rechargeable battery 2 and the electrode assembly 112 are bent, such that the alignment groove G of the electrode assembly 112 is guided by the first and second guides 311 and 312, the protecting tape T enhances the strength of the protruding uncoated part 11c. Thus, in the electrode assembly 112, alignment between the first and second electrodes 11 and 12 and the separator 13 may be maintained in a more stable state.

Figure 7:
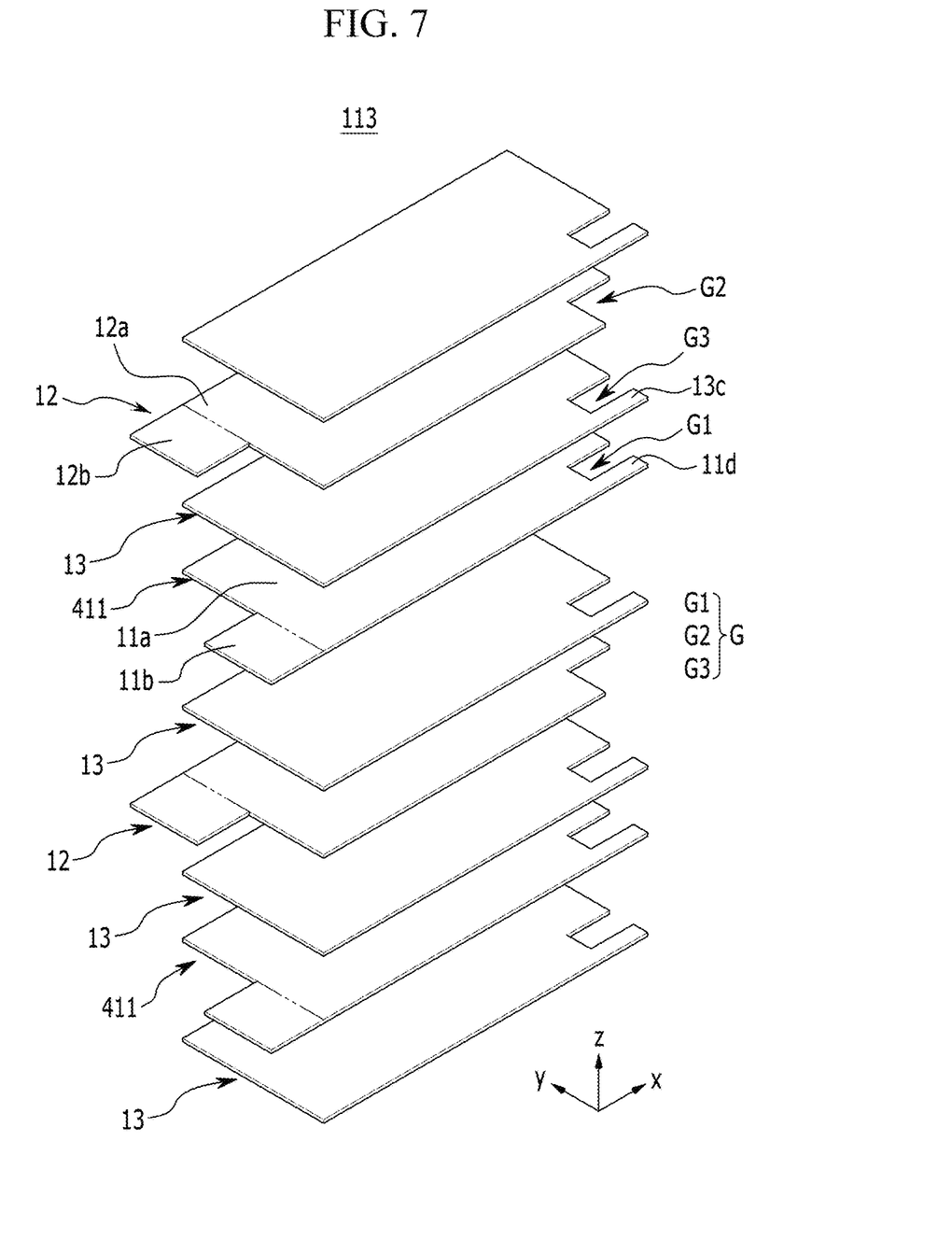
FIG. 7 is an exploded perspective view of an electrode assembly applied to the rechargeable battery according to a second exemplary embodiment
Figure 8:
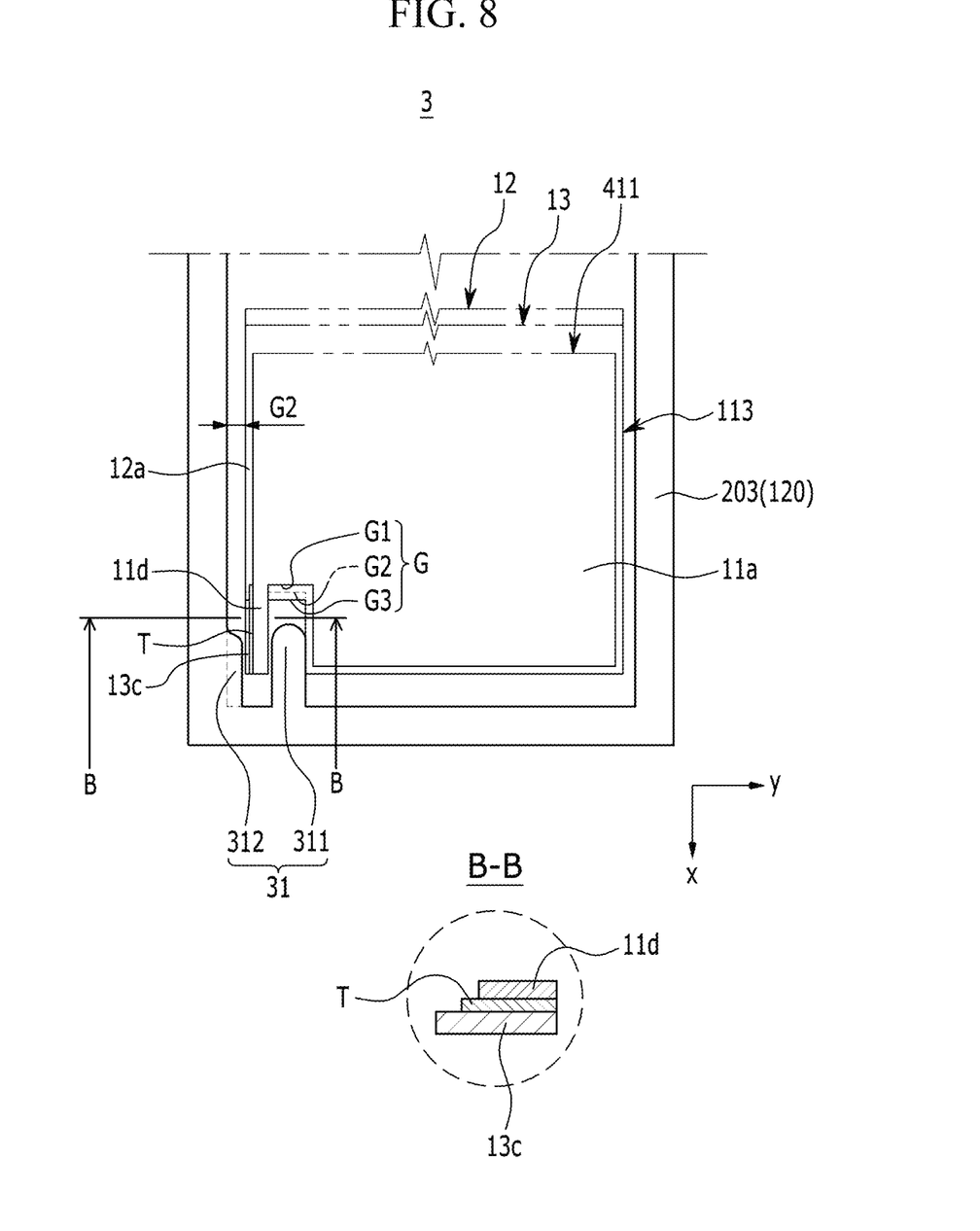
FIG. 8 is a partial plan view showing an alignment state between a gasket and an electrode assembly of FIG. 7.

FIG. 7 is an exploded perspective view of an electrode assembly applied to the rechargeable battery according to a second exemplary embodiment; and FIG. 8 is a partial plan view showing an alignment state between a gasket and an electrode assembly of FIG. 7.

Referring to FIGS. 7 and 8, in a rechargeable battery 3 according to a second exemplary embodiment, a first groove G1 of a first electrode 411 is formed in parallel with the first guide 311 so as to correspond to the first guide 311. A part of the first groove G1 adjacent to the second guide 312 is formed of a protruding coated part 11d of the first electrode 411, wherein the protruding coated part 11d is coupled between the first guide 311 and the second guide 312. That is, when the length of the electrode assembly 113 is changed, the first groove G1 is guided by the first guide 311 and the protruding coated part 11d is guided between the first and second guides 311 and 312.

The second groove G2 of the second electrode 12 is formed so as to correspond to the first groove G1 and the protruding coated part 11d of the first electrode 411. Since the second electrode 12 is formed at a size larger than that of the first electrode 411 and the first groove G1 of the first electrode 411 is formed at a size larger than that of the second groove G2 of the second electrode 12, an entire region (except for the protruding coated part 11d) of the coated part 11a of the first electrode 411 may correspond to the coated part 12a of the second electrode 12. Therefore, capacity performance of the rechargeable battery 3 may be determined by the size of the first electrode 411.

The third groove G3 of the separator 13 is formed so as to correspond to the first groove G1 of the first electrode 411. A part of the third groove G3 adjacent to the second guide 312 is formed of a protruding support part 13c, wherein the protruding support part 13c is coupled between the first guide 311 and the second guide 312 while supporting the protruding coated part 11d of the first electrode 411. Thus, when the length of the electrode assembly 110 is changed, the third groove G3 is guided by the first guide 311 and the protruding support part 13c is guided between the first and second guides 311 and 312.

The protruding coated part 11d of the first electrode 411 has a protecting tape T further attached to one side thereof. The protecting tape T is attached onto one surface of the protruding coated part 11d to enhance strength. For convenience, in FIG. 8, the protecting tape T was shown and visualized so as to be larger than the protruding coated part 11d.

Therefore, when the rechargeable battery 3 and the electrode assembly 113 are bent, such that the alignment groove G of the electrode assembly 113 is guided by first and second guides 311 and 312, the protecting tape T enhances the strength of the protruding coated part 11d. Thus, in the electrode assembly 113, alignment between the first and second electrodes 11 and 12 and the separator 13 may be maintained in a more stable state.

Figure 9:
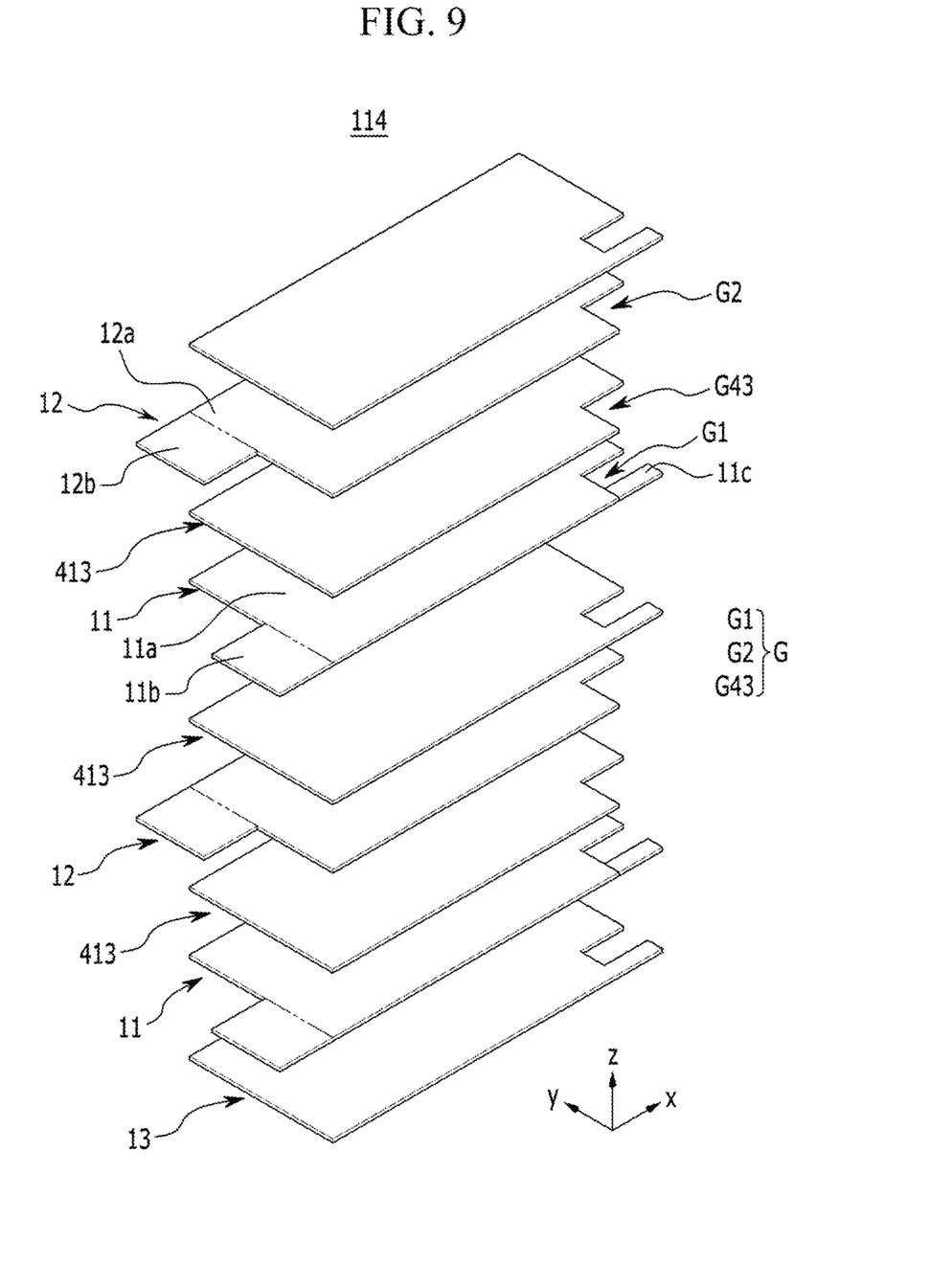
FIG. 9 is an exploded perspective view of an electrode assembly applied to a rechargeable battery according to a third exemplary embodiment.
Figure 10:
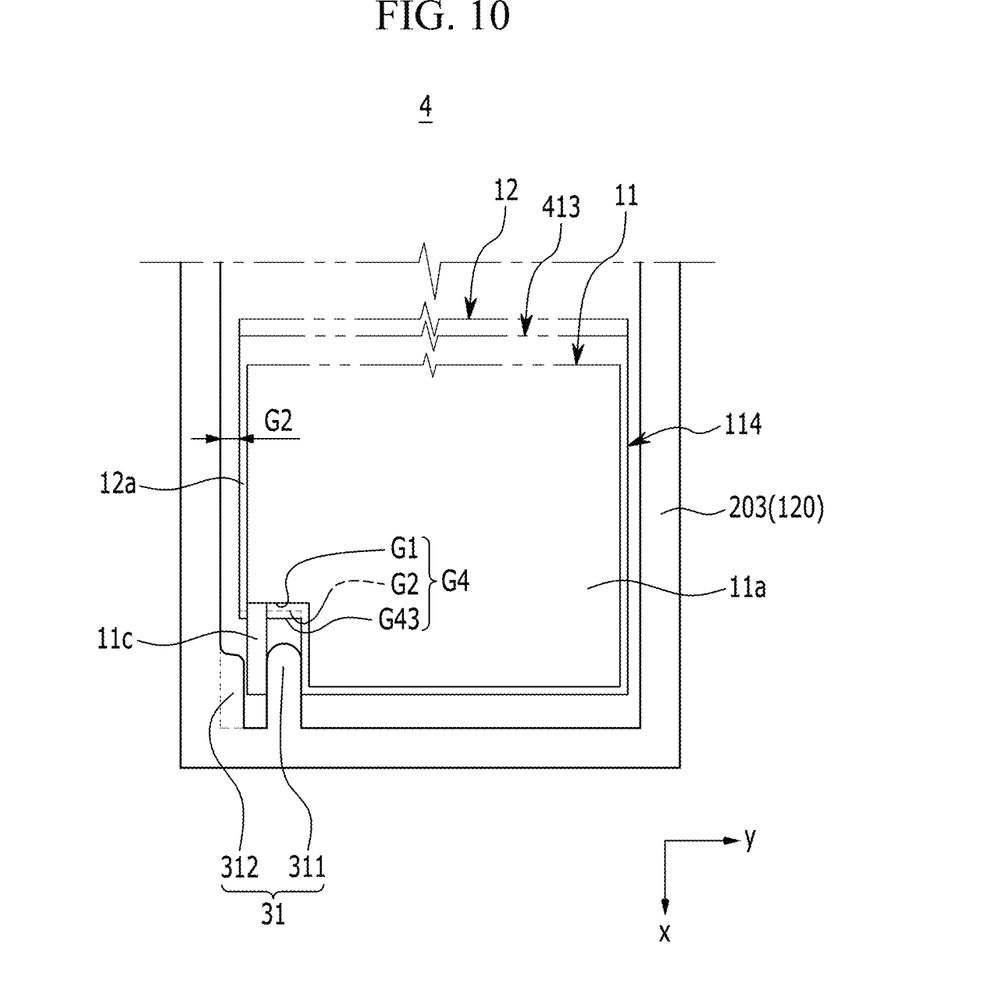
FIG. 10 is a partial plan view showing an alignment state between a gasket and an electrode assembly of FIG. 9.

FIG. 9 is an exploded perspective view of an electrode assembly applied to a rechargeable battery according to a third exemplary embodiment; and FIG. 10 is a partial plan view showing an alignment state between a gasket and an electrode assembly of FIG. 9.

Referring to FIGS. 9 and 10, in a rechargeable battery 4 according to a fourth exemplary embodiment, a third groove G43 of a separator 413 is formed so as to correspond to the first groove G1 of the first electrode 11 and the protruding uncoated part 11c of the first electrode 11. The separator 413 does not include a protruding support part. When the length of the electrode assembly 114 is changed, the third groove G43 is guided by the first guide 311.

Therefore, when the rechargeable battery 4 and the electrode assembly 114 are bent, such that an alignment groove G4 of the electrode assembly 114 is guided by first and second guides 311 and 312, the protruding uncoated part 11c is guided between the first and second guides 311 and 312. In the electrode assembly 114, the first and second electrodes 11 and 12 and the separator 413 may be maintained in a state in which they are aligned with one another.

Figure 11:
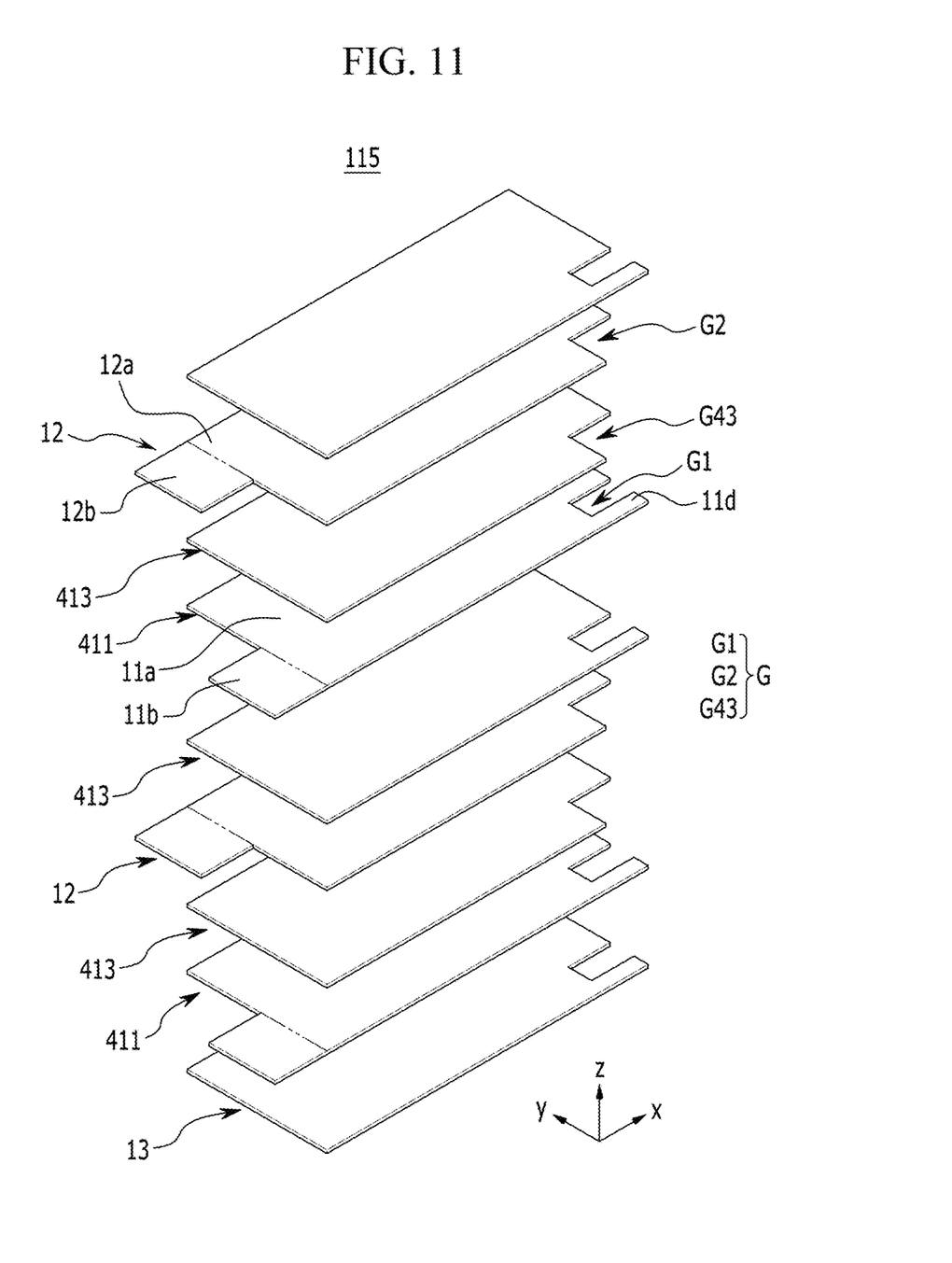
FIG. 11 is an exploded perspective view of an electrode assembly applied to a rechargeable battery according to a fourth exemplary.
Figure 12:
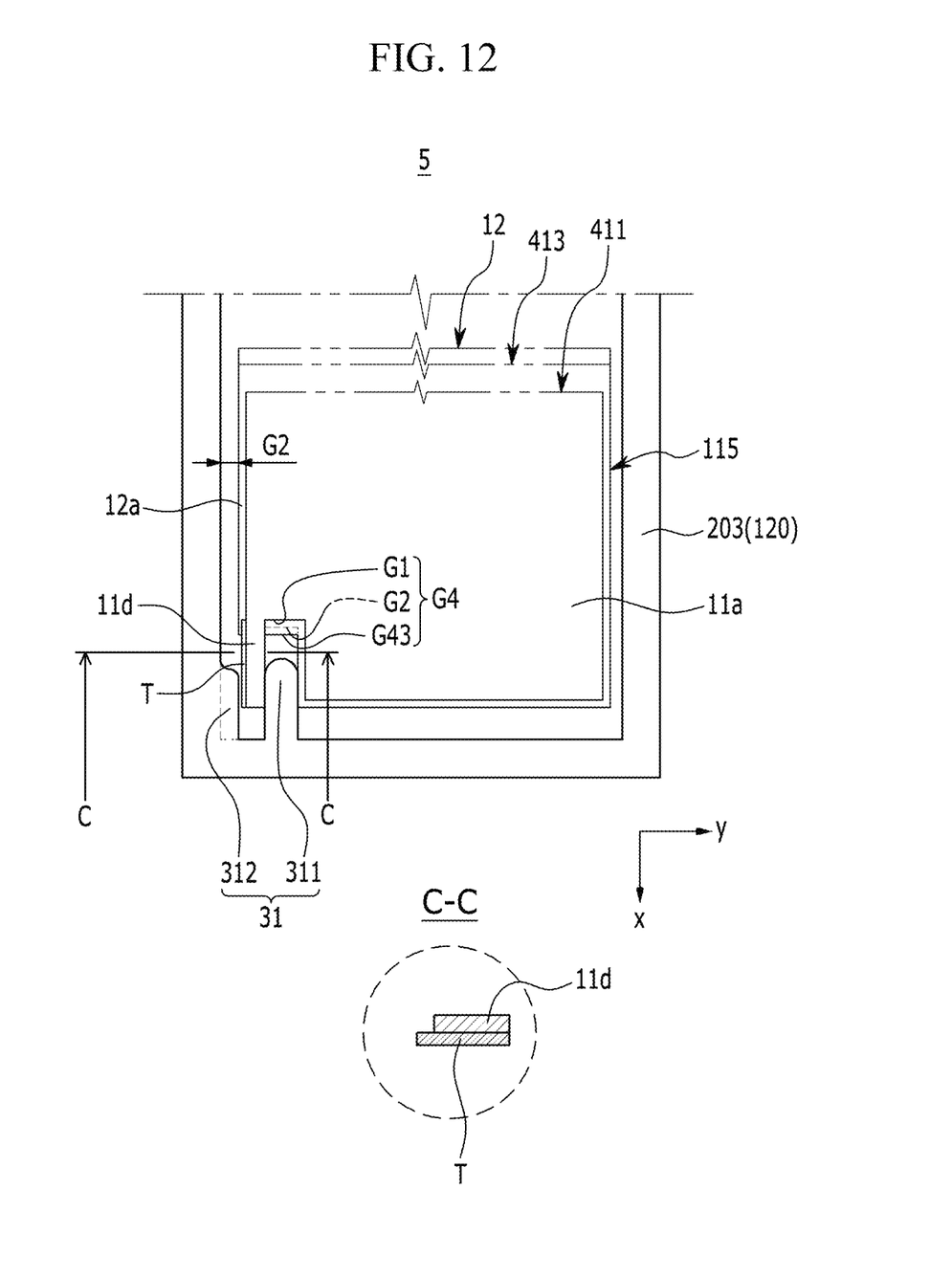
FIG. 12 is a partial plan view showing an alignment state between a gasket and an electrode assembly of FIG. 11.

FIG. 11 is an exploded perspective view of an electrode assembly applied to a rechargeable battery according to a fourth exemplary embodiment; and FIG. 12 is a partial plan view showing an alignment state between a gasket and an electrode assembly of FIG. 11.

Referring to FIGS. 11 and 12, in a rechargeable battery 5 according to a fifth exemplary embodiment, the protruding coated part 11d of the first electrode 11 has a protecting tape T further attached to one side thereof.

The protecting tape T is attached onto one surface of the protruding coated part 11d to enhance strength. For convenience, in FIG. 12, the protecting tape T was shown and visualized so as to be larger than the protruding coated part 11d.

Therefore, when the rechargeable battery 5 and the electrode assembly 115 are bent, such that an alignment groove G4 of the electrode assembly 115 is guided by first and second guides 311 and 312, the protecting tape T enhances the strength of the protruding coated part 11d. Thus, in the electrode assembly 115, alignment between the first and second electrodes 11 and 12 and the separator 413 may be maintained in a more stable state.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments. While the rechargeable battery has been described in connection with what is presently considered to be practical exemplary embodiments, it will be understood by those of ordinary skill in the art that various changes in form and details may be made therein without departing from the spirit or scope of the present disclosure as set forth in the following claims.

What is claimed is:

1. A rechargeable battery comprising:
    an electrode assembly formed by stacking a first electrode, a separator, and a second electrode, and having an alignment groove formed therein at one side thereof;
    a case having flexibility and accommodating the electrode assembly therein; and
    an alignment guide protruding from the case toward the alignment groove and partially coupled to the alignment groove so as to accommodate and guide a change in a length of the electrode assembly depending on bending; and
    first and second electrode tabs connected to the first and second electrodes, respectively and led from one end portion of the case to the outside to form a tab distance there between; and
    wherein the alignment groove and the alignment guide have predetermined lengths in a direction in which the length of the electrode assembly is changed at opposite sides to sides adjacent to the first and second electrode tabs.

2. The rechargeable battery of claim 1, wherein the case includes:
    first and second exterior materials disposed on both surfaces of the electrode assembly, respectively; and
    a gasket leading the first and second electrode tabs to the outside while sealing a space between the first and second exterior materials and including the alignment guide.

3. The rechargeable battery of claim 2, wherein the alignment groove includes first to third grooves each formed in the first and second electrodes and the separator that are stacked and corresponding to the alignment guide.

4. The rechargeable battery of claim 3, wherein the alignment guide includes:
    a first guide protruding from the gasket in a direction in which the length of the electrode assembly is changed; and
    a second guide spaced apart from the first guide to be in parallel with the first guide and formed at a sidewall of the gasket.

5. The rechargeable battery of claim 4, wherein the first groove of the first electrode is formed in parallel with the first guide so as to correspond to the first guide, and a part of the first groove adjacent to the second guide is formed of a protruding uncoated part of the first electrode and is coupled between the first and second guides.

6. The rechargeable battery of claim 5, wherein the second groove of the second electrode is formed so as to correspond to the first groove and the protruding uncoated part of the first electrode.

7. The rechargeable battery of claim 6, wherein the third groove of the separator is formed so as to correspond to the first groove of the first electrode, and a part of the third groove adjacent to the second guide includes a protruding support part supporting the protruding uncoated part of the first electrode.

8. The rechargeable battery of claim 5, wherein the protruding uncoated part of the first electrode has a protecting tape further attached to one side thereof.

9. The rechargeable battery of claim 4, wherein the first groove of the first electrode is formed in parallel with the first guide so as to correspond to the first guide, and a part of the first groove adjacent to the second guide is formed of a protruding coated part of the first electrode and is coupled between the first and second guides.

10. The rechargeable battery of claim 9, wherein the second groove of the second electrode is formed so as to correspond to the first groove and the protruding coated part of the first electrode.

11. The rechargeable battery of claim 10, wherein the third groove of the separator is formed so as to correspond to the first groove of the first electrode, and a part of the third groove adjacent to the second guide includes a protruding support part supporting the protruding coated part of the first electrode.

12. The rechargeable battery of claim 9, wherein the protruding coated part of the first electrode has a protecting tape further attached to one side thereof.

13. The rechargeable battery of claim 6, wherein the third groove of the separator is formed so as to correspond to the first groove and the protruding uncoated part of the first electrode.

14. The rechargeable battery of claim 13, wherein the first groove of the first electrode is formed in parallel with the first guide so as to correspond to the first guide, and a part of the first groove adjacent to the second guide is formed of the protruding uncoated part of the first electrode and is coupled between the first and second guides.

15. The rechargeable battery of claim 11, wherein the protruding coated part of the first electrode has a protecting tape further attached to one side thereof.

* * * * *